United States Patent [19]

Okazaki et al.

[11] Patent Number: 4,698,755

[45] Date of Patent: Oct. 6, 1987

[54] PRINTER CONTROL SYSTEM AND METHOD OF DESIGNATING FUNCTIONS OF PRINTER

[75] Inventors: Kenichi Okazaki, Owariasahi; Kunio Morimoto, Seto; Kazumi Sawano; Masami Aoki, both of Owariasahi, all of Japan

[73] Assignee: Hitachi, Ltd., Tokyo, Japan

[21] Appl. No.: 751,590

[22] Filed: Jul. 3, 1985

[30] Foreign Application Priority Data

Jul. 3, 1984 [JP] Japan ................................ 59-136574

[51] Int. Cl.$^4$ ................................ G01D 15/00

[52] U.S. Cl. ................................ 364/519; 346/154

[58] Field of Search ................................ 364/518, 519, 523; 346/74.2, 154; 400/114; 360/1, 17, 39; 358/301

[56] References Cited

U.S. PATENT DOCUMENTS 4,536,773 8/1985 Kokaji et al. ................................ 346/74.2

4,542,384 9/1985 Tazaki ................................ 364/518

*Primary Examiner*—Arthur G. Evans

*Attorney, Agent, or Firm*—Antonelli, Terry & Wands

[57] ABSTRACT

A printer control system including a printer and a control unit for controlling the printer is disclosed. The printer function designating information which is used to designate the functions, which vary in accordance with the kind of a job to be done, of the printer is stored in a memory in the control unit. When a printing operation of the printer is started, the function designating information is outputted from the memory, transmitted from the control unit to the printer and stored temporarily in a memory provided in the printer. Various kinds of operations are carried out in accordance with a control code transmitted from the control unit to the printer, and an operation for a designated job is carried out with reference to the function designating information. The designation of functions include the designation of the magnetic recording density of a printing medium having magnetic stripes, and the designation of the function of operation keys for controlling the feeding and discharge of the printing medium.

10 Claims, 11 Drawing Figures

PRINTER CONTROL SYSTEM AND METHOD OF DESIGNATING FUNCTIONS OF PRINTER

BACKGROUND OF THE INVENTION

This invention relates to a control system for printers, and more particularly to a printer control system capable of making a printer perform a special function selected from a plurality of functions, and a method of designating the functions of a printer.

There are cases where a printer provided with different key arrangements, different magnetic stripe processing functions and different character patterns for different jobs to be done is required as a printer for outputting computer-processed data. For example, there are cases where the paper feed key to be pressed to cause paper to be fed into the printer needs to be located as the extreme left key on the control key board for processing a job A, and located as the extreme right key for processing a job B. With regardto the magnetic stripe processing function of a printer, there are cases where it is necessary to set the recording density of a magnetic stripe to 100 BPI (bit per inch) for a job A, and 150 BPI for a job B. There are cases where it is necessary to print a mark representative of the kind of a job, for distinguishing the jobs A, B from each other. In such cases, according to the conventional techniques in this field, a printer having a paper feed key at the extreme left portion of a control key board, for recording a density of 100 BPI, while printing a mark representative of a job A is required for carrying out a job A, and a printer having a paper feed key at the extreme right portion of a control key board, for recording density of 150 BPI, while printing a mark representative of a job B is required for carrying out a job B.

Preparing printers having different specifications for different kinds of jobs increases the manufacturing cost. In addition, it is uneconomical to use printers of this type for the reason that the tasks which can be carried out by each printer are limited.

SUMMARY OF THE INVENTION

Therefore, it is necessary to develop a printer which is capable of carrying out various kinds of jobs. A printer having regular functions utilizable for various kinds of jobs, and special functions selectively utilizable for predetermined kinds of jobs has only been proposed.

An object of the present invention is to provide a printer control system having a simple construction, and which is capable of easily carrying out a complicated designation operation, such as an operation for designating a character pattern, starting a printer in a short period of time, and a method of designating the functions of a printer.

Another object of the present invention is to provide a method having a simple implementation and capable of utilizing a printer having various kinds of functions, by designating a function with printer function-designating information from a control unit without providing the printer with any special function-designating switch.

The printer control system according to the present invention consists of a control unit for controlling an operation of a printer, and a printer which actuates each part in accordance with instructions from the control unit while practicing various operations of the printer, such as the printing of characters, writing and reading of magnetic stripes and feeding in and discharging of paper.

The information for designating one of a plurality of functions of a printer, which functions can be selected in accordance with the kind of a job to be done by the printer, is stored in advance in a memory in a control unit. When an operation of the printer is started, the printer function-designating information is read from the memory in the control unit, and the information is transmitted to the printer to be stored in a memory therein. When the printer performs various kinds of operations in accordance with control codes transmitted from the control unit, the functions, which can be switched when the kind of a job to be done is changed, of the printer are designated with reference to the printer function-designating information stored in the memory in the printer, and the operations of the printer in accordance with the control codes are then carried out.

DESCRIPTION OF THE PREFERRED EMBODIMENT

Figure 1:
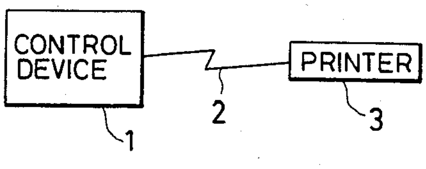
FIG. 1 is a block diagram showing an example of a printer control system to which the present invention is applied.

The present invention will now be described in more detail with reference to its embodiment shown in the drawings.

FIG. 1 illustrates an example of a printer control system to which the present invention is applied, in which a control unit 1 and a printer 3 are connected together by a circuit 2. The control unit 1 is adapted to prepare electronically coded sentences to be printed by the printer 3, and analyze the data on magnetic stripes read from magnetic stripes by the printer 3. The control unit 1 also designates the information on the key arrangement, character pattern and magnetic stripes for the printer 3. The printer 3 is provided with a mechanism for printing the received electronically coded sentences, a mechanism for feeding in and discharging printing paper and a mechanism for reading data written on magnetic stripes.

Figure 2:
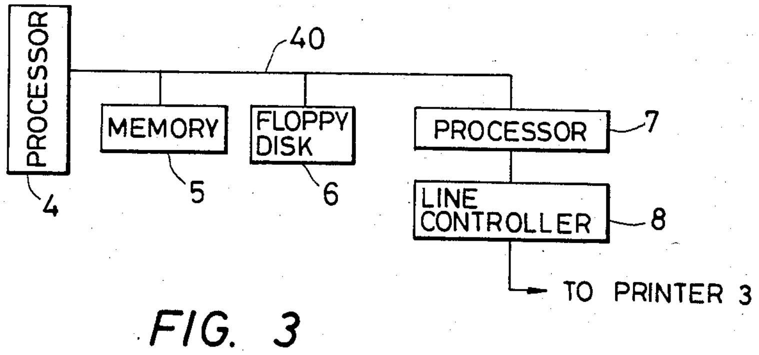
FIG. 2 is a block diagram of an example of a control unit shown in FIG. 1.

FIG. 2 is a block diagram showing a specific construction of the control unit 1 shown in FIG. 1. Referring to FIG. 2, a memory 5 and a floppy disc 6 are connected to a processor 4 through a bus 40, and controlled thereby. A program required to actuate the processor 4 is read from the floppy disc when a power source is turned on, and stored in the memory 5. Referring to FIG. 2, a processor 7 is used to control a circuit controller 8, and a program required to actuate the processor 7 is read from the floppy disc 6 when the power source is turned on, and stored in the memory 5 in the same manner as the program required to actuate the processor 4. The circuit controller 8 functions to convert data in parallel format, which are to be transmitted to the printer 3, into data in seral format, and converting the data of serial format, which are transmitted from the printer 3, into data in parallel format so as to take the resultant data into the control unit 1.

Figure 3:
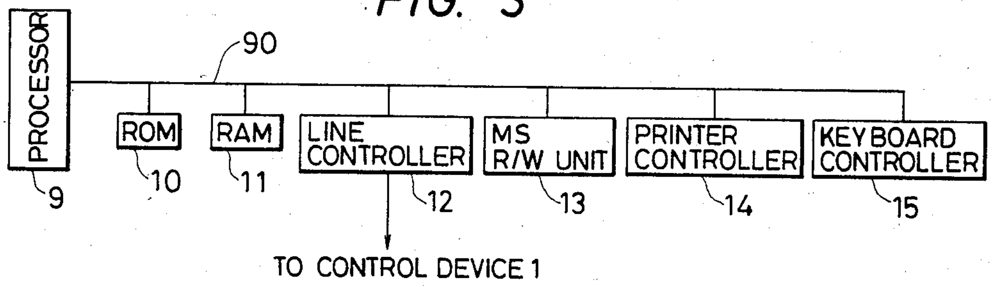
FIG. 3 is a block diagram of an example of a printer shown in FIG. 1.

FIG. 3 is a block diagram of the printer 3 shown in FIG. 1. Referring to FIG. 3, a processor 9 is adapted to control through a bus 90 ROM 10, RAM 11, a circuit controller 12, a magnetic stripe read/write unit 13, a paper feeding and dot printing control unit 14 and an operating key board control unit 15. A programm required to actuate the processor 9 is stored in ROM 10. The data transmitted from the control unit 1 are stored in the RAM 11. These data include character patterns and the printer function-designating information which will be described later. The circuit controller 12 converts the data in parallel format, which are transmitted to the control unit 1, into data in serial format, and converts the data in serial format, which are transmitted from the control unit 1, into data of parallel format and transmits the resultant data to the printer 3. The magnetic stripe read/write unit 13 reads the information stored in the magnetic stripes attached to the paper, and writes data on the magnetic stripes on the basis of the data transmitted from the control unit 1. The paper feeding and dot printing control unit 14 carries out the feeding of paper, the starting of a new paragraph and the discharging of paper, and prints the data in RAM on the paper. The operating key board control unit 15 reads the keys pressed on an operating key board.

Figure 4:
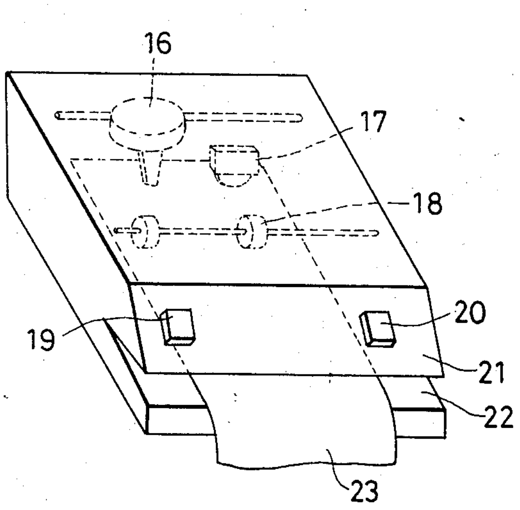
FIG. 4 is a perspective view of a specific example of the printer.

FIG. 4 illustrates an example of the printer 3. As shown in this drawing, the paper 23, which has magnetic stripes provided on predetermined portions thereof, is fed into the printer 3 through an inserter 22 and discharged therefrom. The feeding and discharging of the paper 23 is performed by a paper feed mechanism 18 which includes a motor (not shown) and a roller mechanism connected thereto. The paper 23 is printed by a serial dot printing unit 16 including a wire matrix type printing head, and the reading of data on the magnetic stripes and the writing of the data are done by a magnetic stripe unit 17 including a magnetic head. One of the keys 19, 20 on a key board 21 is designated as a paper feed key, and the other as a paper discharge key, in accordance with the data from the control unit 1.

When the paper feed key 19 or 20 is pressed, a signal is transmitted to the processor 9 through the operating key board control unit 15, and the processor 9 is operated to drive the paper feed mechanism 18 while controlling the paper feeding and dot printing control unit 14, so that the paper 23 is fed. The processor 9 drives the dot printing mechanism 16 while controlling the paper feeding and dot printing control unit 14, in accordance with the data received from the control unit 1 through the circuit controller 12, to print character pattern on the paper 23. The processor 9 is also operated to drive the magnetic stripe reading mechanism 17 while controlling the magnetic stripe reading unit 13, to read the magnetic stripes on the paper 23. When the paper discharge key 19 or 20 is pressed, the paper 23 is discharged in the same steps as in the case where the paper-feeding operation is carried out.

Figure 5:
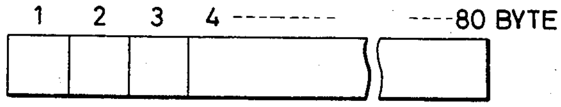
FIG. 5 illustrates an example of a format of the printer function-designating information transmitted from the control unit to the printer.

FIG. 5 shows an example of printer function-designating information output from the control unit 1 to the printer 3. The printer function-designating information is stored on the floppy disc 6, and it is stored in the memory 5 when an electric power source for the control unit 1 is turned on as a result of the the information being transmitted to the printer 3. The printer function-designating information includes the information on the designation of magnetic recording density of magnetic stripes, and the designation of the paper feed key and paper discharge key, and the data on printing patterns for different jobs. As shown in the drawing, the data on the designation of magnetic recording density is allotted to the first byte, the data on the designation of keys to the seciond and third bytes, and the data on the printing patterns for different jobs to the fourth to eightieth bytes. When the first byte is "0", 100 BPI is designated as the magnetic recording density, and, when the first byte is "1", 150 BPI. The second byte is used to designate the functions of the key 19. When the second byte is "0", the key 19 is designated as a paper discharge key, and, when the second byte is "1", as a paper feed key. The third byte is used to designate the functions of the key 20. When the third byte is "0", the key 20 is designated as a paper discharge key, and, when the third byte is "1" as a paper feed key. The data on the printing patterns for different jobs are allotted from the fourth to eightieth bytes.

Figure 6:
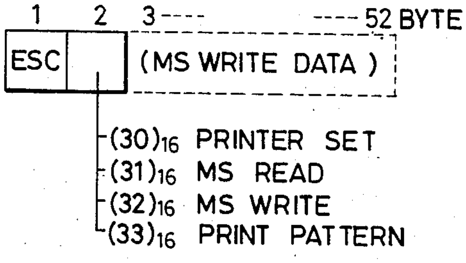
FIG. 6 illustrates examples of control codes transmitted from the control unit to the printer.

FIG. 6 illustrates examples of control codes transmitted from the control unit 1 to the printer 3. An escape code ESC indicating that the data are control codes as allotted to the first byte, and the contents of instructions for the control unit 3 to the second byte. To be specific, when the second byte is $(30)_{16}$, $(31)_{16}$, $(32)_{16}$ and $(33)_{16}$, it means a printer setting instruction, a magnetic stripe reading instruction, a magnetic stripe writing instruction and a job pattern printing instruction, respectively. When the second byte is $(32)_{16}$ meaning a magnetic stripe writing instruction, the magnetic stripe write data are allotted to the third to fifty-second bytes.

When the printer has received a resetting instruction as a control code, the printer function designating information stored in RAM 11 is cleared by the processor 9. The dot printing mechanism 16 is then moved to an initial position by controlling the paper feeding and dot printing control unit 14, and the paper 23 is discharged by using the paper feed mechanism 18. When the printer has received a magnetic stripe reading instruction as a control code, the magnetic stripe mechanism 17 is moved over the magnetic stripes on the paper 23 by the processor 9 with the magnetic stripe read unit 13 controlled thereby, so as to read the magnetic stripe data stored in the magnetic stripes, and transmit the data in the form of electronically coded sentences to the control unit 1. When the printer 3 has received a magnetic stripe writing instruction as a control code, the magnetic stripe mechanism 17 is moved over the magnetic stripes on the paper 23 in the same manner as in the case where the printer 3 has received a magnetic stripe reading instruction, so as to write the magnetic stripe write data allotted to the third to fifty-second bytes of magnetic stripe write instructions. When the printer 3 has received a job pattern printing instruction, the job printing patterns stored in RAM 11 are read by the processor 9, to print the patterns on the paper 23 by using the paper feeding and dot printing control unit 14, dot printing mechanism 16 and paper feed mechanism 18.

Figure 7:
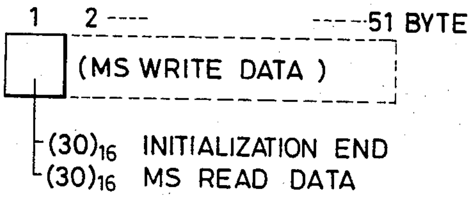
FIG. 7 illustrates examples of electronically coded sentences transmitted from the printer to the control unit.

FIG. 7 illustrates examples of encoded sentences transmitted from the printer 3 to the control unit 1. When the first byte is $(30)_{16}$, it means the completion of initialization, and when the first byte is $(31)_{16}$, it means the magnetic stripe read data.

Figure 8:
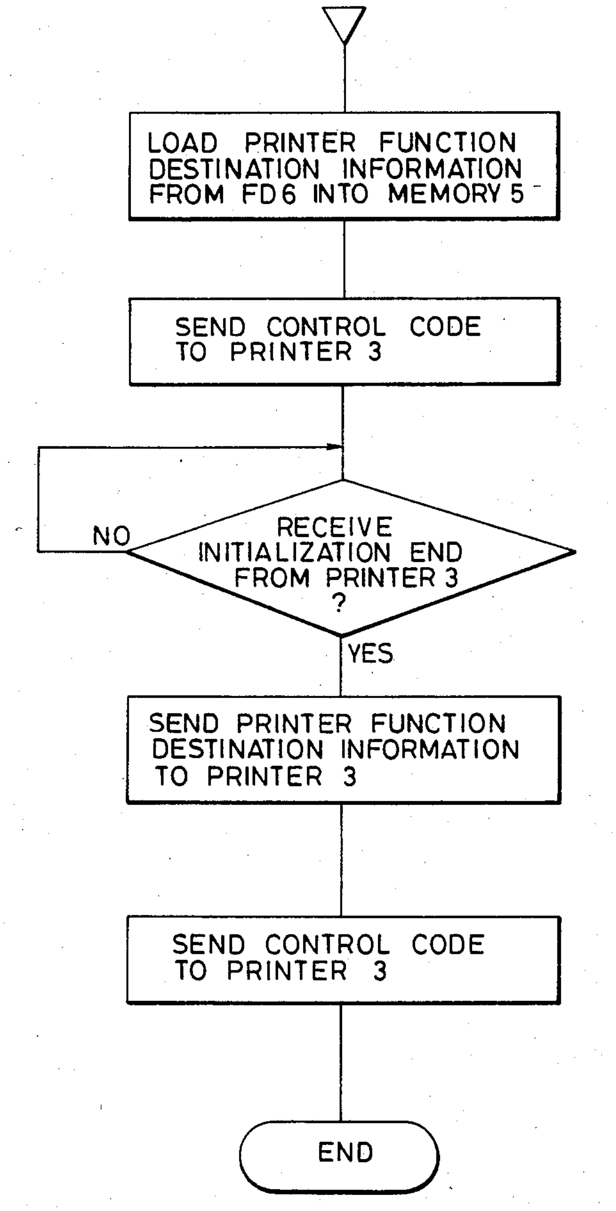
FIG. 8 is a flow chart of an operation of the control unit.
Figure 9:
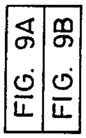
FIGS. 9, 9A, 9B are a flow chart of an operation of the printer.
Figure 9A:
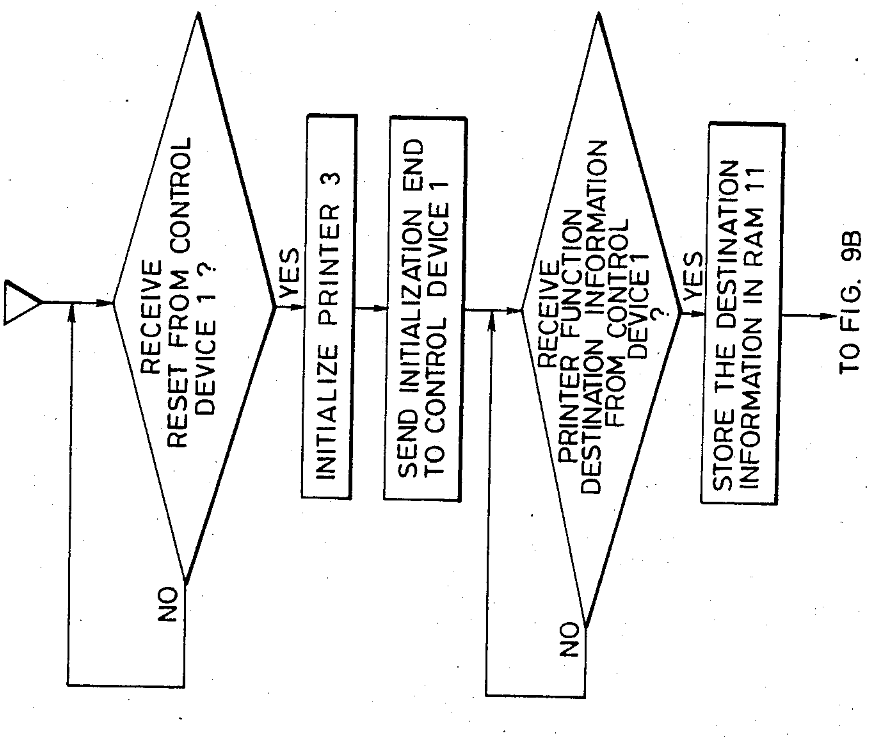
Figure 9B:
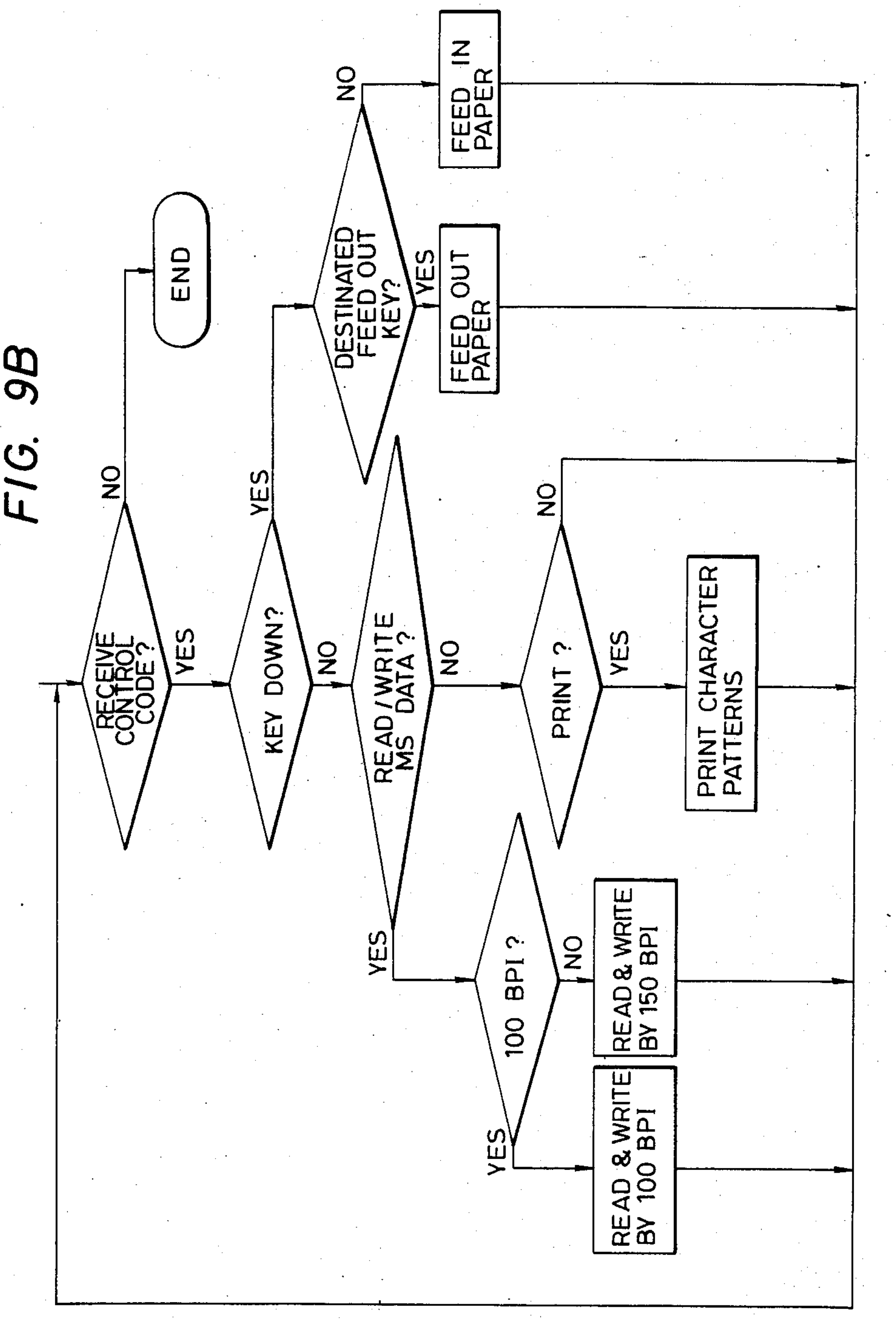

FIG. 8 is a flow chart showing the operation of the control unit 1, and FIG. 9 is a flow chart showing an operation of the printer 3. As shown in FIG. 8, when a power source for the control unit 1 is turned on, the processor 4 in the control unit 1 is operated to read the printer function designating information from the floppy disc 6, and store the information in the memory 5. The processor 4 then reads a control code which means a printer resetting instruction from the memory 5, and transmits the control code to the printer 3. When the printer 3 has received a control code indicative of a printer resetting instruction from the control unit 1 as shown in FIG. 9, it initializes itself. Namely, the processor 9 resets the circuit controller 12, magnetic stripe reading unit 13, paper feeding and dot printing control unit 14 and operating key board control unit 15, and returns the dot printing mechanism 16, magnetic stripe reading mechanism 17 and paper feed mechanism 18 to the initial state. When this initialization operation has been completed, an electrorically coded statement meaning the completion of the initialization operation is transmitted from the printer 3 to the control unit 1.

The control unit 1 judges whether or not it has received an electronically coded statement meaning the completion of an initialization operation from the printer 3, as shown in FIG. 8, and, when the answer is affirmative, the printer function designating information stored in the memory 5 is read and transmitted to the printer 3.

The printer 3 judges whether or not it has received the printer function designating information from the control unit 1, as shown in FIG. 9, and, when the answer is affirmative, the content of the information is stored in RAM 11. The function of the printer 3 is then determined in accordance with the printer function designating information stored in RAM 11. As previously mentioned, the printer function designating information consists of the information on the designation of magnetic recording density, the information on the key arrangement, and job printing patterns. The content of such information is stored in RAM 11. When the printer 3 is actuated, its function is determined with reference to the content of the above-mentioned information. For example, when the key 19 is pressed as shown in FIG. 9, the processor 9B refers to the second byte of the printer function designating information stored in RAM 11. When the second byte is "0", the key 19 is judged to be a paper discharge key, and the paper is discharged. When the second byte is "1", the key 19 is judged to be a paper feed key, and the paper is fed. When a magnetic stripe read instruction has been input as a control code, the first byte of the printer function designating information is referred to, and the magnetic recording density is judged whether it is 100 BPI or 150 BPI. The magnetic stripes are read with 100 BPI or 150 BPI, and an electronically coded sentence indicating the content thereof is transmitted to the control unit 1. When a magnetic stripe writing instruction is input as a control code, the magnetic recording density is judged whether it is 100 BPI or 150 BPI in the same manner as in the case where a magnetic stripe reading instruction is inputted, and the writing of the magnetic stripe writing data is done with 100 BPI or 150 BPI. When a job pattern printing instruction is inputted as a control code, the job printing patterns of the fourth to eightieth bytes in the printer function designating information are referred to, and the printing is done on the paper 23 by using the paper feeding and dot printing control unit 14, dot printing mechanism 16 and paper feed mechanism 18.

As is clear from the above description, this embodiment is capable of varying the printer function designating information, which is stored in the memory 5 in the control unit 1, by interchanging the floppy discs 6, which are prepared so that the number thereof corresponds to the number of kinds of jobs, for the control unit 1. Therefore, when the exchangeable recording medium, such as a floppy disc is changed every time the kind of job to be done is changed, the function of the printer can be designated, so that only one type of printer may be provided to carry out a plurality of kinds of jobs.

This printer function designating information consists of several tens of bytes of data, and a program as a whole for the printer has several tens of kilobytes. Accordingly, the time of transmission of the printer function designating information can be reduced to a small fraction of that in a conventional printer control system in which the program as a whole for the printer is transmitted from a control unit to a printer. Therefore, the present invention enables a printer to be driven in a an extremely short period of time.

We claim:

1. A printer control system having a printer, and a control unit connected to and for controlling said printer wherein:

(a) said control unit comprises a first memory for storing function information for designating a function of said printer, which function can be varied when a job to be performed by said printer is varied, and printing data, and a control means for outputting a control code for use in controlling a mechanism which constitutes said printer; and (b) said printer comprises a second memory for storing therein the function information and printing data which are transferred from said first memory in said control unit thereto, a mechanism for feeding a printing medium, a printing mechanism driven in accordance with a control code transmitted from said control means, and printing the printing data, which are outputted from said second memory, on said printing medium, a key control means for designating the feeding and discharging of said printing medium from said mechanism for feeding, and a processor means for controlling, in accordance with the function information read from said second memory, a designation operation, which is carried out by said key control means, so that the content of the designation operation can be varied.

2. A printer control system in accordance with claim 1, wherein said control unit further comprises: a third memory for use in advance storing various parts of function information for different jobs, which function information can be loaded in said first memory.

3. A printer control system in accordance with claim 2, wherein said third memory comprises: a recording medium which can be interchanged with another recording medium in accordance with the kind of a job to be performed.

4. A printer control system in accordance with claim 1, wherein said control system further comprises: a magnetic recording and reproducing means which is started in accordance with a control code from said control means in said control unit, and which carries out recording and reproducing operations with respect to a magnetic recording portion of said printing medium, said recording and reproducing operations being carried out with different magnetic recording densities in accordance with results of an analysis of said function information from said processor means.

5. A printer control system havin a printer, and a control unit connected to and for controlling said printer wherein:

(a) said control unit comprises a first memory for storing function information for designating the functions of said printer, which functions can be varied in accordance with the kind of a job to be performed by said printer, a control means for outputting a control code for controlling the setting and resetting of said printer and said mechanism in said printer; and (b) said printer comprises a seciond memory for storing the function information transferred from said first memory in said control unit, a mechanism for feeding a printing medium provided with a magnetic recording medium, a printing mechanism controlled in accordance with a control code from said control means, and printing the printing data, which are outputted from said second memory, on said printing medium, a magneetic recording and reproducing means controlled in accordance with a control code from said control means, and writing and reading data on said magnetic recording medium, a key control means controlled in accordance with a control code from said control means, and setting the direction in which said printing medium is fed from said feed mechanism, and a processor means for decoding said function information read from said second memory, and designating the magnetic recording density in said magnetic recording and reproducing means and the direction of feeding of the printing medium which is to be set by said key control means.

6. A printer control system in accordance with claim 5, wherein said control unit further comprises: a third memory for advance storing the function information, which can be loaded on said first memory, and which varies in accordance with the kind of jobs to be performed by said printer.

7. A printer control system in accordance with claim 6, wherein said third memory comprises: a floppy disc which can be interchanged in accordance with the kind of a job to be performed by said printer.

8. A method of designating the functions of a printer in a printer control system, comprising the steps:

(a) advance storing in the memory function informaation which can be varied in accordance with a kind of a job to be performed by a printer;

(b) providing a printing medium having a magnetic recording portion;

(c) analyzing the function information;

(d) designating a feeding mode and a discharge mode of said printing medium in said printer in accordance with results of the analysis;

(e) designating the recording density of said magnetic recording portion in accordance with the results of the analysis; and (f) printing the printing data on said printing medium in accordance with the results of the analysis.

9. A method of designating the functions of a printer in accordance with claim 8, wherein said method further comprises the steps: providing in advance a recording medium for use in recording the function information which varies in accordance with the kind of a job to be performed by said printer; and loading the function information from said recording medium on said memory.

10. A method of designating the functions of a printer in accordance with claim 8, wherein said method further comprises the step: giving an instruction for carrying out or not carrying out a printing operation of said printer and for subjecting said recording medium to recording and reproduction in accordance with a control code transferred from said control unit, in advance of a designation of various functions which are in accordance with the function information.

* * * * *